(12) United States Patent
Mizrahi (10) Patent No.: US 9,069,489 B1
(45) Date of Patent: Jun. 30, 2015

(54) DYNAMIC RANDOM ACCESS MEMORY FRONT END (75) Inventor: Noam Mizrahi, Modi'in (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 818 days.

(21) Appl. No.: 13/071,229

(22) Filed: Mar. 24, 2011

Related U.S. Application Data (60) Provisional application No. 61/318,603, filed on Mar. 29, 2010.

(51) Int. Cl.
*G06F 5/12* (2006.01)
*G06F 12/08* (2006.01)

(52) U.S. Cl.
CPC ............. *G06F 5/12* (2013.01); *G06F 12/0804* (2013.01)

(58) Field of Classification Search
CPC . G06F 11/2071; G06F 3/0635; G06F 3/0607; G06F 3/0689; G06F 3/061; G06F 12/0866; G06F 3/0608; G06F 2003/0697; G06F 3/0613; G06F 3/0622; G06F 3/0659; G06F 12/0868; G06F 12/0873; G06F 2212/314; G06F 2212/7203; G06F 12/08; G06F 5/12; G06F 2212/720304
USPC ......... 711/122, 124, 140, 121, 158, 167–169, 711/118, 130
See application file for complete search history.

(56) References Cited

U.S. PATENT DOCUMENTS

| | | | |
|---|---|---|---|
| 4,574,351 A | 3/1986 | Dang et al. | |
| 4,612,612 A | 9/1986 | Woffinden et al. | |
| 4,682,281 A | 7/1987 | Woffinden et al. | |
| 5,315,707 A | 5/1994 | Seaman et al. | |
| 5,657,471 A | 8/1997 | Lary et al. | |
| 5,860,149 A | 1/1999 | Fiacco et al. | |
| 6,009,463 A | 12/1999 | Brandt et al. | |
| 6,078,993 A | 6/2000 | Iwata et al. | |
| 6,112,265 A * | 8/2000 | Harriman et al. | 710/40 |
| 6,282,589 B1 | 8/2001 | Porterfield et al. | |
| 6,343,351 B1 | 1/2002 | Lackman et al. | |
| 6,378,052 B1 | 4/2002 | Genduso et al. | |
| 6,487,640 B1 * | 11/2002 | Lipasti | 711/140 |
| 6,647,423 B2 | 11/2003 | Regnier et al. | |
| 6,654,860 B1 * | 11/2003 | Strongin et al. | 711/154 |
| 6,918,005 B1 | 7/2005 | Marchant et al. | |
| 6,963,924 B1 | 11/2005 | Huang et al. | |

(Continued)

FOREIGN PATENT DOCUMENTS

| | | |
|---|---|---|
| CN | 1226704 A | 8/1999 |
| CN | 1617107 A | 5/2005 |

(Continued)

OTHER PUBLICATIONS

Taylor et al., "System-onChip Packet Processor for an Experimental Network Services Platform", Globecom 2003, IEEE, pp. 3933-3937.

*Primary Examiner* — Zhuo H Li (57) ABSTRACT

Some of the embodiments of the present disclosure provide a method comprising receiving a first set of memory access commands; modifying the first set of memory access commands to generate a second set of memory access commands; and in response to said generation of the second set of memory access commands, issuing the second set of memory access commands to a memory. Other embodiments are also described and claimed.

14 Claims, 6 Drawing Sheets

(56) References Cited

U.S. PATENT DOCUMENTS

| | | | |
|---|---|---|---|
| 7,093,094 B2 * | 8/2006 | Cismas | 711/169 |
| 7,234,039 B1 | 6/2007 | Righi et al. | |
| 7,430,623 B2 | 9/2008 | Walls et al. | |
| 7,600,131 B1 | 10/2009 | Krishna et al. | |
| 7,664,938 B1 | 2/2010 | Tripathi et al. | |
| 7,813,342 B2 | 10/2010 | Gadelrab | |
| 7,877,524 B1 | 1/2011 | Annem et al. | |
| 7,889,734 B1 | 2/2011 | Hendel et al. | |
| 7,930,451 B2 | 4/2011 | Chen et al. | |
| 8,250,322 B2 * | 8/2012 | Huang et al. | 711/158 |
| 2004/0184470 A1 | 9/2004 | Holden | |
| 2005/0193158 A1 | 9/2005 | Srinivasan et al. | |
| 2005/0198464 A1 | 9/2005 | Sokolov | |
| 2005/0256976 A1 | 11/2005 | Susairaj et al. | |
| 2005/0286513 A1 | 12/2005 | King | |
| 2006/0004941 A1 | 1/2006 | Shah et al. | |
| 2006/0026342 A1 * | 2/2006 | Calvignac et al. | 711/105 |
| 2006/0045090 A1 | 3/2006 | Ronciak et al. | |
| 2006/0179333 A1 * | 8/2006 | Brittain et al. | 713/320 |
| 2006/0236063 A1 | 10/2006 | Hausauer et al. | |
| 2006/0288134 A1 | 12/2006 | Baker et al. | |
| 2007/0081538 A1 | 4/2007 | Ganji | |
| 2008/0005405 A1 | 1/2008 | Innis et al. | |
| 2008/0109613 A1 * | 5/2008 | Jarosh et al. | 711/154 |
| 2008/0112415 A1 | 5/2008 | Sobaje | |
| 2008/0228871 A1 | 9/2008 | Sano | |
| 2008/0232374 A1 | 9/2008 | Kopelman et al. | |
| 2008/0240111 A1 | 10/2008 | Gadelrab | |
| 2008/0279208 A1 | 11/2008 | Walls et al. | |
| 2009/0083392 A1 | 3/2009 | Wong et al. | |
| 2010/0118885 A1 | 5/2010 | Congdon | |
| 2011/0072162 A1 | 3/2011 | Rysavy | |
| 2011/0296063 A1 | 12/2011 | Pais et al. | |
| 2012/0218890 A1 | 8/2012 | Gerkis | |
| 2012/0219002 A1 | 8/2012 | Sobaje | |

FOREIGN PATENT DOCUMENTS

| | | |
|---|---|---|
| CN | 1682502 A | 10/2005 |
| CN | 1922591 A | 2/2007 |
| JP | H05173953 A | 7/1993 |
| JP | H07202946 A | 8/1995 |

* cited by examiner

DYNAMIC RANDOM ACCESS MEMORY FRONT END

CROSS REFERENCE TO RELATED APPLICATIONS

The present application claims priority to U.S. Patent Application No. 61/318,603, filed Mar. 29, 2010, the entire specification of which is hereby incorporated by reference in its entirety for all purposes, except for those sections, if any, that are inconsistent with this specification.

TECHNICAL FIELD

Embodiments of the present disclosure relate to memory access systems in general, and more specifically, architectures and methods for improving dynamic random access memory utilization.

BACKGROUND

Unless otherwise indicated herein, the approaches described in this section are not prior art to the claims in the present disclosure and are not admitted to be prior art by inclusion in this section.

With increasing dual data rate (DDR) speeds and native burst lengths, dynamic random access memory (DRAM) technology today offers very high throughput capabilities to the system. However, along with a high potential throughput gain, the overhead associated with a random access to DRAM data may dramatically increase a cycle count. For example, while sequentially executing memory access commands, different pages in the DRAM may need to be opened to accommodate each sequential memory access command. In an example, a page in the DRAM is opened while executing a memory access command, wherein the page was previously opened (and subsequently closed) while executing another memory access command in the immediate past. This may translate into lower efficiency of the system and longer latencies. Conventional attempts to compensate for these efficiency and latency concerns include the use of faster and more expensive DRAM components.

SUMMARY

In various embodiments, the present disclosure provides a method comprising receiving a first set of memory access commands; modifying the first set of memory access commands to generate a second set of memory access commands; and in response to said generation of the second set of memory access commands, issuing the second set of memory access commands to a memory.

In various embodiments, there is also provided a method comprising receiving, from one or more device masters, a first set of read commands to read data from a memory; based on said receiving, first determining that requested data of a first plurality of read commands of the first set of read commands is stored in a buffer that is associated with the memory; and based on said first determining, returning requested data of the first plurality of read commands, from the buffer, to the one or more device masters.

In various embodiments, there is also provided a method comprising receiving a plurality of write commands from one or more device masters; writing the plurality of write commands to a buffer line in a buffer; determining that the buffer line includes write information that is greater than a threshold amount; and writing the buffer line to a dynamic random access memory (DRAM) based on said determining.

In various embodiments, there is also provided an apparatus comprising a buffer having a plurality of buffer banks corresponding to a plurality of memory banks that are included in a dynamic random access memory (DRAM) to which the apparatus is configured to be coupled; and a controller coupled with the buffer and configured to receive a first set of memory access commands, modify the first set of memory access commands to generate a second set of memory access commands, and in response to said generation of the second set of memory access commands, issue the second set of memory access commands to a memory.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

In the following detailed description, reference is made to the accompanying drawings which form a part hereof wherein like numerals designate like parts throughout, and in which is shown by way of illustration embodiments that may be practiced. It is noted that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
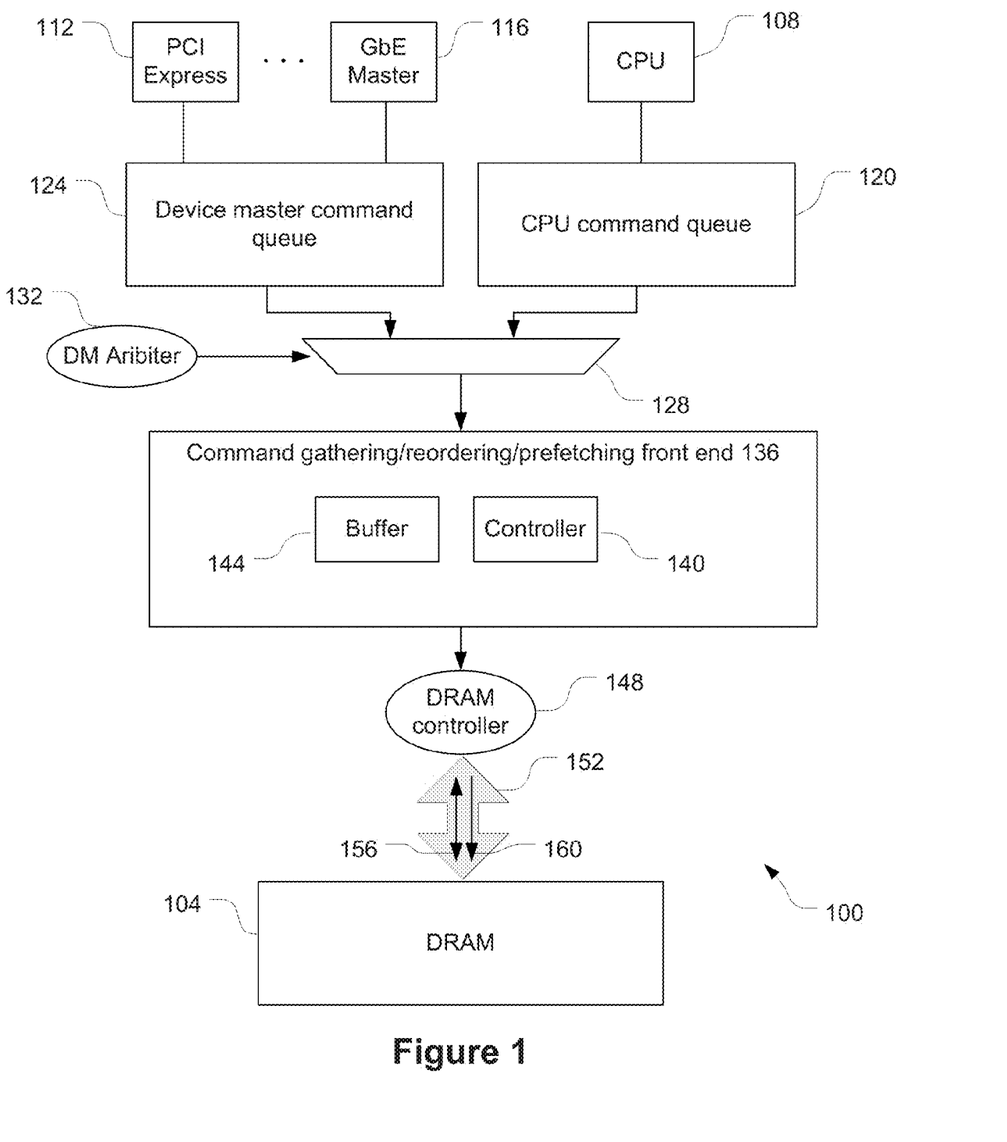
FIG. 1 illustrates a computing environment in accordance with an embodiment of the present disclosure.

FIG. 1 illustrates a computing environment 100 in accordance with an embodiment of the present disclosure. Briefly, the computing environment 100 includes a plurality of device masters capable of performing direct memory accesses with respect to a memory, e.g., dynamic random access memory (DRAM) 104. In accordance with an embodiment, the device masters include one or more central processing units 108, only one being shown for the purpose of maintaining conceptual clarity, and one or more other device masters capable of accessing the DRAM 104 independently of the CPU 108. The other device masters include, but are not limited to, a peripheral component interconnect (PCI) express master 112, Gigabit Ethernet (GbE) master 116, etc.

In accordance with an embodiment, memory access commands issued from the CPU 108 are queued in a CPU command queue 120 (e.g., in an order received). Similarly, memory access commands issued from other device masters are queued in a device master command queue 124 (e.g., in an order received). Although FIG. 1 illustrates only one device master command queue 124, in an embodiment, the computing environment 100 includes a plurality of device master command queues corresponding to a plurality of device masters (e.g., a first device master command queue corresponding to the PCI express master 112, a second device master command queue corresponding to the GbE master 116, etc). The command queues are coupled with a multiplexer 128, which is controlled by a device master (DM) arbiter 132. The DM arbiter 132 issues the memory access commands from the command queues according to the DM priority scheme. In some embodiments the DM priority scheme gives priority to memory access commands from the CPU command queue 120. In other embodiments other priority schemes may be employed by the DM arbiter 132.

The multiplexer 128 serially issues the memory access commands to a command gathering/reordering/prefetching front end 136 (also referred henceforth as the front end 136). In an embodiment, the front end 136 includes a controller 140 and a buffer 144. The controller 140 receives memory access commands from the multiplexer 128 and controls storage of data in the buffer 144 and issuance of memory access commands to a DRAM controller 148. The DRAM controller 148 interfaces with the DRAM 104 through a memory interface 152 to effectuate the transfers, e.g., of the memory access commands. The memory interface 152, which may also be referred to as a memory bus, includes a data bus 156 and an address bus 160.

Although not illustrated in FIG. 1, the DRAM 104 is organized in a plurality of banks, for example bank 0, . . . bank 7, for a dual data rate (DDR) 3 embodiment. Each bank includes a number of pages. In at least some embodiments, the DRAM controller 148 will need to open a page prior to issuing a memory access command with respect to an address of the page.

The controller 140 performs various operations such as write gathering, read prefetching, and reordering of memory access commands to improve system efficiencies. Briefly, in an embodiment, the write gathering is performed so that write accesses (e.g., associated with write commands received by the front end 136) to the DRAM 104 are of a size that corresponds, in predetermined proportions, to a transaction granularity of the memory interface 152; the read prefetching is performed to decrease response time to device masters and to increase a resource utilization (e.g., increase a utilization of the memory interface 152); and the reordering of the memory access commands is performed to reduce memory access overhead. The write gathering and/or the command reordering is based on an efficiency algorithm that increases utilization efficiency of the memory interface 152. In an embodiment, utilization efficiency of the memory interface 152 is measured by a number of consumed data cycles divided by a total number of data cycles.

In an example, the multiplexer 128 outputs three read commands, associated with the same bank of the DRAM 104, in a first order, e.g., read 0 (of page 0), read 1 (of page 1), and read 2 (of page 0). In a conventional system (e.g., without the front end 136) the DRAM 104, while processing the three read commands, would (i) open page 0 to perform read 0; (ii) close page 0 and open page 1 to perform read 1; and (iii) close page 1 and open page 0 to perform read 2. The overhead related to opening and closing the pages to perform these read operations will translate into unused data cycles, which will decrease utilization efficiency of the conventional system. In an embodiment and according to the above discussed efficiency algorithm (as will be discussed in more detail herein), the three read commands (e.g., which are received in the first order) are reordered (e.g., by the front end 136) in a second order (e.g., in an order of read 0, read 2 and read 1) such that the reordered read commands, while being executed, results in a better utilization of the memory interface 152. In an embodiment, the above discussed efficiency algorithm reorders and/or performs write gathering of various memory access commands such that, for example, the utilization efficiency of the memory interface 152 is increased.

The operations of the front end 136 will be described in further detail with respect to the flowcharts of FIGS. 2-4. A specific embodiment of the front end 136 will be shown and described with respect to FIG. 5.

Figure 2:
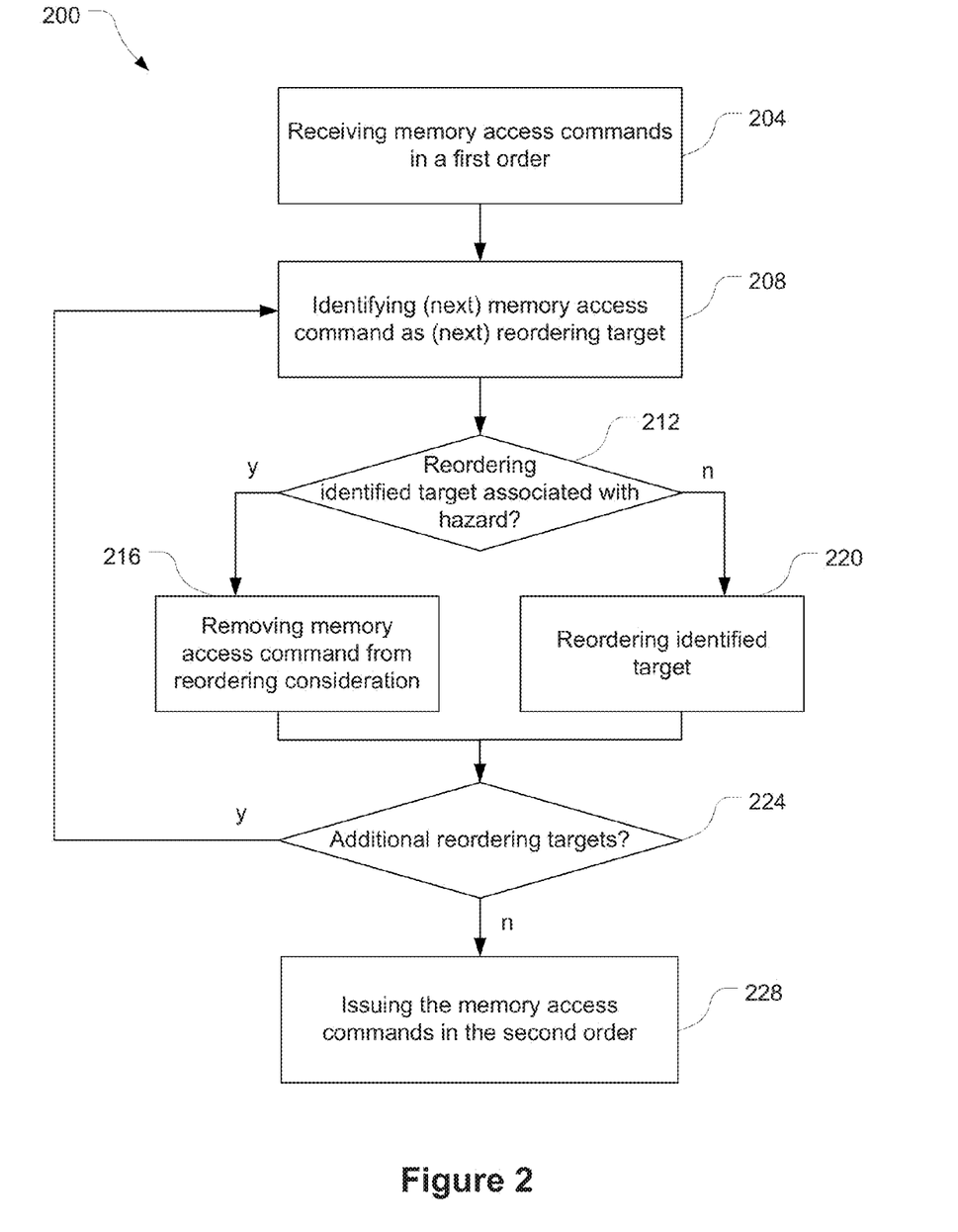
FIG. 2 is a flowchart depicting a reorder operation in accordance with an embodiment of the present disclosure.

FIG. 2 is a flowchart depicting a reorder operation 200 in accordance with an embodiment of this disclosure. The reorder operation 200 begins at block 204 with the front end 136 receiving memory access commands (e.g., from the command queues, via the multiplexer 128) in a first order. Unless otherwise indicated, in an embodiment, the operations of the reorder operation 200 are performed by the front end 136 and, in particular, by the controller 140. In other embodiment, other modules perform these operations. The first order of the memory access commands are dictated by the priority scheme employed by the DM arbiter 132, which reflects a determination of the relative priorities between the device master command queue 124 and CPU command queue 120. The reorder operation 200 advances to block 208 after block 204.

Block 208 of the reorder operation 200 includes identifying a memory access command as a reordering target. Identification of a memory access command as a reordering target is based on the efficiency algorithm intended to increase utilization efficiency of the memory interface 152. The efficiency algorithm instructs reordering of memory access commands in light of specific characteristics of the technology of the underlying memory, e.g., DRAM 104.

For example, a memory access command to a particular page of a given bank may be identified as a reordering target if another memory access command, which occurs earlier in the sequence of memory access commands, is associated with the same page and bank. In the previously discussed example of the three read commands being received in the first order (e.g., read 0 (of page 0), read 1 (of page 1), and read 2 (of page 0)), read 2 will be identified as the reordering target based at least in part on the efficiency algorithm.

In another example, the multiplexer 128 outputs four read commands, e.g., read A (of page 1 of bank 2), read B (of page 1 of bank 3), read C (of page 3 of bank 1) and read D (of page 5 of bank 6), in that order. As each of these read commands are directed towards different banks, in an embodiment, these commands are not reordered (e.g., as such reordering will not result in two sequential read commands accessing the same page of the same bank). However, if the read D command was instead directed towards, e.g., page 1 of bank 2, then the read commands could have been reordered such that the read A and read D commands are executed sequentially (i.e., read D could have been identified as a possible reordering target).

In an embodiment, subsequent to the operations at block 208, the reorder operation 200 advances to block 212. Block 212 of the reorder operation 200 includes a determination as to whether the reordering of the identified target, e.g., placing the memory access command ahead of one or more other memory access commands, is associated with a hazard. A hazard may be a starvation hazard or a data integrity hazard, for example. A starvation hazard means that a particular memory access command is at risk of not being issued to the DRAM controller 148 in the desired timeframe. A data integrity hazard occurs if, for example, a read to a particular address is placed in front of a write to the same address. In other embodiments other hazards may be defined and used. If a hazard is determined to be associated with the reordering of the identified target at block 212, the reorder operation 200 advances to block 216, which includes removing the memory access command from reordering consideration.

If, at block 212, a hazard is determined to not be associated with the reordering of the identified target, the reorder operation 200 advances to block 220, which provides for reordering of the identified target. Reordering of the identified target includes, for example, placing the memory access command ahead in the sequence to be consecutive with the memory access command of the same bank and page of the DRAM 104. Referring again to the above example, read 2 will be placed ahead of read 1.

Following block 216 (or block 220), the reorder operation 200 advances to a determination of whether there are additional reordering targets at block 224. If it is determined, at block 224, that there are additional reordering targets, the reorder operation 200 returns to block 208 at which point the next memory access command is identified as the next reordering target. If it is determined, at block 224, that there are no additional reordering targets, the reorder operation 200 advances to block 228.

In the embodiment seen, block 228 of the reorder operation 200 includes issuing, to the DRAM controller 148, the memory access commands in the second order. The second order of the above-discussed example will be read 0, read 2, read 1. The DRAM controller 148 then accesses the DRAM 104 to effectuate the memory access commands in the second order. This involves the DRAM controller 148 (1) opening page 0 to perform both read 0 and read 2; and (2) closing page 0 and opening page 1 to perform read 1. In this manner the overhead cost is reduced by one page open/close with respect to the issuance of the three reads in the first order. Thus, the utilization efficiency of the memory interface 152 will be greater with respect to the second order than with respect to the first order. In general, assuming the reordering of at least one memory access command, the second order will be different from the first order and the second order will result in a greater utilization efficiency of the memory interface 152 as compared to the first order. Thus, the memory access commands are reordered, according to the efficiency algorithm, such that to the extent possible, memory access commands for the same page in the same bank are executed sequentially, to increase the utilization efficiency of the memory interface 152.

While the operations of reorder operation 200 are generally presented as sequential operations to reorder a plurality of memory access commands, it is noted that the various operations may take place simultaneously with one another and the process may be implemented on a continuous basis. For example, the additional reordering of targets determination of block 224 and issuing the memory access commands in the second order of block 228 may take place at the same time. Thus, it may not be necessary to determine an order of all of the pending memory access commands before some of the memory access commands are issued.

Figure 3:
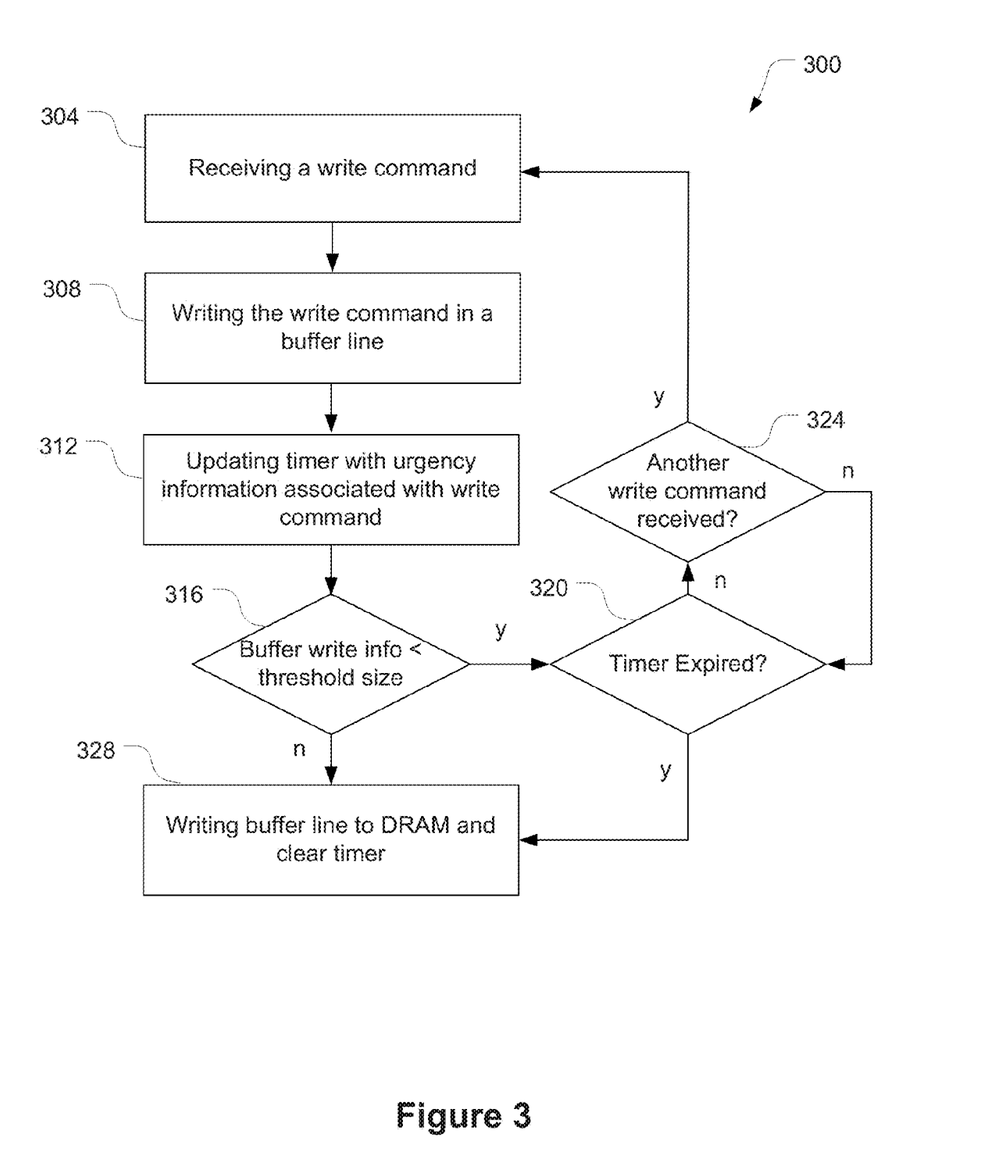
FIG. 3 is a flowchart depicting a write-gathering operation in accordance with an embodiment of the present disclosure.

FIG. 3 is a flowchart depicting a write-gathering operation 300 in accordance with an embodiment of this disclosure. In an embodiment, the write-gathering operation 300 operation is performed by the front end 136. The write-gathering operation 300 begins at block 304, with the front end 136 receiving a write command from the multiplexer 128. Unless otherwise indicated, operations of the write-gathering operation 300 are performed by the front end 136 and, in particular, by the controller 140. The write command includes a command portion and a payload portion and may have a total size that is less than a buffer line of the buffer 144. For example, a write command may be 32 bytes, while a buffer line may be 128 bytes. The write-gathering operation 300 advances to block 308 after block 304.

Block 308 of the write-gathering operation 300 includes writing the write command in a buffer line of the buffer 144. The write-gathering operation 300 advances to block 312 after block 308.

Block 312 of the write-gathering operation 300 includes updating a timer with urgency information associated with the write command. The timer is used by the controller 140 to ensure that a write command does not languish in a buffer line (e.g., for greater than a predetermined period of time) without being pushed to the DRAM 104 eventually. Urgency information may be generic to all write commands. Alternatively, particular write commands may be associated with particular urgency information. This urgency information may be carried along with the write command or may be inferred from the nature of the write command.

In some embodiments, urgency information will not be used. When data is written to a buffer line of the buffer 144, and not yet pushed to the DRAM 104, the buffer 144 will contain more updated data as compared to the DRAM 104 (e.g., as the DRAM 104 has not been updated yet by more recent data from the write commands, which are buffered in the buffer 144). In an embodiment, if a read command is directed to an address line of the updated buffer, the data will be returned directly from the buffer line. Therefore, the amount of time the DRAM 104 is outdated may not be of concern as long as the more updated buffer line gets written to the DRAM 104 prior to being expunged from buffer 144. In another embodiment, if a read command is directed to an address line of the updated buffer, the data will be returned directly from the buffer line only if the data in the buffer line is in a valid state (e.g., if the DRAM 104 has been synchronized with the data in the buffer line).

The write-gathering operation 300 advances to block 316 after block 312. Block 316 of the write-gathering operation 300 includes a determination as to whether the buffer line includes write information of a size that is greater than a threshold size. The threshold size is a predetermined proportion of a transaction granularity of the memory interface 152. For example, in one embodiment the transaction granularity of the memory interface 152, which may also be referred to as native burst length, is 128 bytes (which may dictate/influence the sizing of the buffer lines of the buffer 144). In this embodiment, the threshold size is set to 128 bytes, i.e., a full buffer line. In other embodiments the threshold size will be a size that is less than the transaction granularity of the memory interface 152.

If it is determined at block 316 that the write information of the buffer line is of a size that is less than the threshold size, then the write-gathering operation 300 will advance to block 320. At block 320 a determination will be made as to whether the timer has expired. In various embodiments, the timer value is configurable, and is, for example, in a order of about 40-50 cycles of a clock associated with the DRAM 104. If it is determined that the timer has not expired at block 320, the write gathering operation 300 will wait to receive another command at block 324. If it is determined, at block 324, that another command is received, the write-gathering operation 300 will advance to block 304.

In an embodiment, write commands that are directed towards, e.g., a same bank of the DRAM 104 (or a same page of a bank) are buffered in a same area of the buffer 144 (e.g., in the same buffer line of the buffer 144). In an embodiment, on the other hand, write commands that are directed towards, e.g., different banks of the DRAM 104 (or different pages of a bank) are buffered in different areas of the buffer 144 (e.g., in different buffer lines of the buffer 144).

If it is determined, at block 324, that another command is not received, then the write-gathering operation 300 will loop back to block 320. The write-gathering operation will loop between blocks 320 and 324 until another write command is received or until the timer expires. If it is determined, at block 320, that the timer has expired or it is determined, at block 316, that the size of the write information in the buffer line is greater than the previously discussed threshold size, then the write-gathering operation 300 will advance to block 328.

Block 328 of the write-gathering operation 300 includes issuing the one or more write commands of the buffer line to the DRAM controller 148. In an embodiment, the DRAM controller 148 then issues the write command(s) to the DRAM 104 in a manner in which at least a desired portion (e.g., all) of the space of the transaction (e.g., of the memory interface 152) is utilized by the write command(s). For example, in one embodiment the transaction granularity of the memory interface 152 is 128 bytes, and the issued write command(s) are about 128 bytes, thereby occupying all the space of the transaction in the memory interface 152.

It is noted that in the event the timer is determined to expire at block 320, the write commands of a buffer line may not fill the desired portion of the transaction granularity. However, in this event, the computing environment 100 will be operating at a reduced throughput and a relatively lower priority will be attributed to maintaining high utilization efficiency of the memory interface 152.

In the described manner, the front end 136 gathers a plurality of write commands in a buffer line and writes the buffer line to the DRAM 104 upon a determination that the write information is greater than a threshold amount. This write-gathering operation 300 will be employed so that small write commands that will be issued from device masters do not significantly reduce the utilization efficiencies of memory transactions at the memory interface 152.

Figure 4:
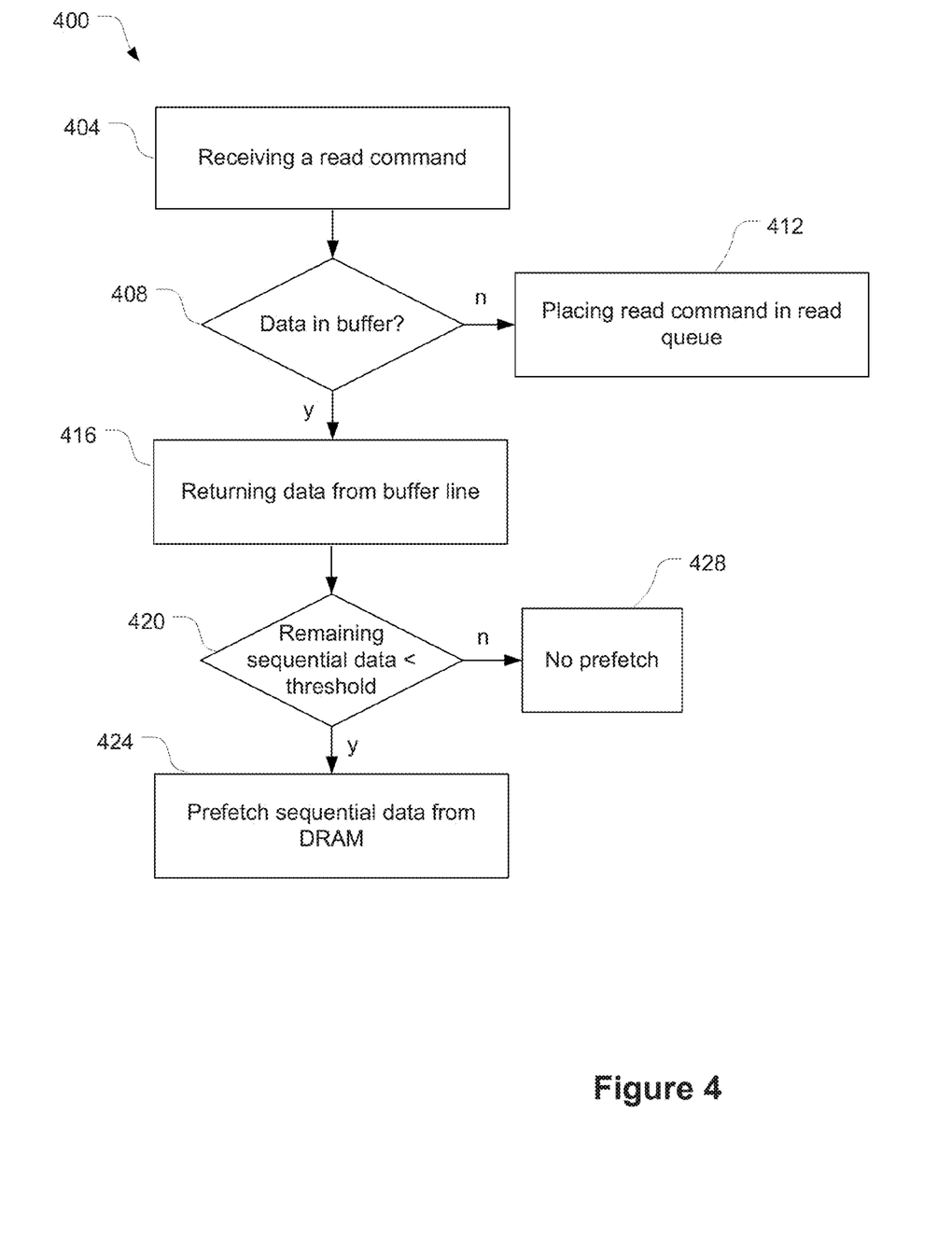
FIG. 4 is a flowchart depicting a prefetch operation in accordance with an embodiment of the present disclosure.

FIG. 4 is a flowchart depicting a prefetch operation 400 in accordance with some embodiments of this disclosure. The prefetch operation 400 begins at block 404, with the front end 136 receiving a read command from the multiplexer 128. Unless otherwise indicated, operations of the prefetch operation 400 will be performed by the front end 136 and, in particular, by the controller 140. The prefetch operation 400 will advance to block 408 after block 404.

Block 408 of the prefetch operation 400 includes a determination of whether data requested in the read command is included in the buffer 144.

If it is determined, at block 408, that the requested data is not in the buffer 144, the prefetch operation 400 advances to block 412 and the read command will be placed in a read queue. At this point, the front end 136 performs reordering as discussed above with respect to FIG. 2 (e.g., based on the previously discussed efficiency algorithm).

If it is determined, at block 408, that the requested data is in the buffer 144, the prefetch operation advances to block 416. Block 416 of the prefetch operation 400 includes returning data from the buffer line. In this manner, when possible, the front end 136 will return requested data to the device master without accessing the DRAM 104. Operations at block 416 will be followed by operations at block 420.

Block 420 of the prefetch operation 400 includes a determination of whether remaining sequential data in the buffer 144 is less than a prefetch threshold. Consider, for example, that 128 sequential bytes had previously been read from the DRAM 104 into the buffer 140. Sequential bytes are data accessed from sequential addresses. Consider further, that the read command received at block 404 is one of a plurality of read commands, each requesting 32 bytes of the 128 sequential bytes. The controller 140, at block 420, determines whether the remaining (e.g., yet unrequested) sequential data is less than a prefetch threshold of, e.g., 64 bytes. If the remaining sequential data is less than the prefetch threshold, then the controller 140 will, at block 424, prefetch the next portion of sequential data from the DRAM 104 in anticipation of further read commands being received requesting such data. Prefetching sequential data includes self-generation of a read command, by the controller 140. The self-generated command is then placed in a read queue, which can be reordered as described above with respect to FIG. 2.

If it is determined, at block 420, that the remaining sequential data is not less than the prefetch threshold, then the prefetch operation 400 advances to block 428 and no prefetching is performed. In some embodiments, the prefetch threshold is a configurable option.

In an embodiment, the write-gathering operation 300 of FIG. 3 is performed concurrently with, prior to, or subsequent to the reorder operation 200 of FIG. 2. For example, concurrently with and/or subsequent to the front end 136 gathering a plurality of write commands (e.g., according to the write-gathering operation 300), the front end 136 also reorders the gathered write commands (e.g., according to the reorder operation 200).

In an embodiment, the prefetch operation 400 of FIG. 4 is performed concurrently with, prior to, or subsequent to the reorder operation 200 of FIG. 2. For example, concurrently with and/or subsequent to the front end 136 prefetching a plurality of read commands (e.g., according to the prefetch operation 400), the front end 136 also reorders one or more read commands (e.g., according to the reorder operation 200). For example, as previously discussed, the front end 136 performs the reorder operation at block 412 of the prefetch operation 400 of FIG. 4.

In an embodiment, the front end 136 is configured to perform only the reorder operation 200, only the write-gathering operation 300, only the prefetch operation 400, or any combination of two or more of these three operations. In an embodiment, the front end 136 is configured to perform the reorder operation 200 to the memory access commands, the write-gathering operation 300 specifically to the write memory access commands and the prefetch operation 400 specifically to the read memory access commands.

Figure 5:
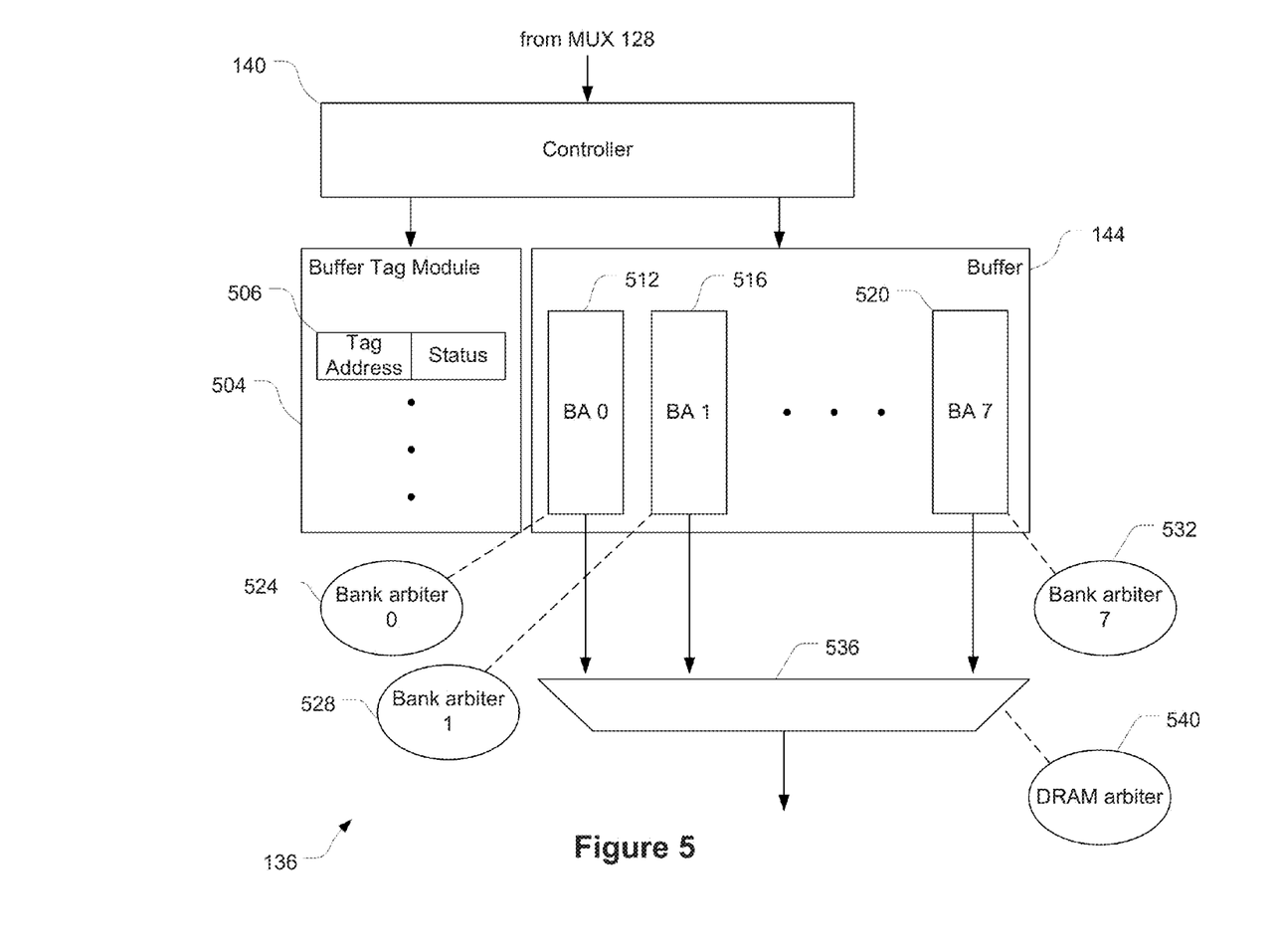
FIG. 5 illustrates a front end in accordance with an embodiment of the present disclosure.

FIG. 5 illustrates the front end 136 in accordance with an embodiment of this disclosure. The front end 136 includes a buffer tag module 504, the buffer 144, and the controller 140, which in an embodiment are coupled with one another at least as shown.

The buffer 144 has a structure that complements a structure of the DRAM 104. This complementary structure includes a number of banks, shown as bank address (BA) 0 212, BA 1 216, ..., and BA 7 220. As previously described, DRAM of a DDR 3 memory system includes eight banks, for example. Therefore, in this embodiment the buffer 144 also includes eight banks.

Each bank of the buffer 144 includes a number of buffer lines, with the buffer lines being of a size that corresponds to a transaction granularity, e.g., of the memory interface 152. In some embodiments, the correspondence between the buffer line and the transaction granularity is a one-to-one correspondence. That is, if the transaction granularity is X bytes, then the buffer line is also X bytes.

The buffer tag module 504 includes a record 506 for each buffer line. Each record includes a tag address, which corresponds to a buffer line address, and a buffer-line status. The buffer-line status of the record is, for example, valid, modified, or pending. A valid status means that the data in the buffer line is the same as the data in the corresponding line of the DRAM 104. A modified status means that the data in the buffer line has been updated more recently than the data in the corresponding line of the DRAM 104. In some embodiments, a modified line may be evicted by the controller 140 in dead cycles, and will become empty line. A pending status means that a buffer line is in the process of being written to the DRAM 104 (or being read from or prefetched from the DRAM 104). In an example, a pending status occurs if a write gathering operation is taking place with respect to a particular buffer line. In another example, a pending status occurs if a read command or a prefetch command is issued, but data is yet to be read from the DRAM 104 (refers to the time from which the command was issued till the time data is read from the DRAM 104).

Outputs from each of the banks of the buffer 144 is controlled by a corresponding bank arbiter, for example bank arbiter 0 524, bank arbiter 1 528, ... bank arbiter 7 532. The bank arbiters, which may be considered sub-elements of the controller 140, are responsible for implementing a first level of arbitration in accordance with the previously discussed efficiency algorithm. The first level of arbitration is the reordering of memory access commands within a particular bank. The reordering may be similar to the reorder operation 200 described above. In various embodiments, a bank arbiter can reorder the memory access commands by selectively controlling a multiplexer (not illustrated in FIG. 5) coupled to the bank arbiter.

The memory access command output from each of the banks is provided to a multiplexer 536. The multiplexer 536 is controlled by a DRAM arbiter 540 that implements a second level of arbitration for the front end 136. The DRAM arbiter 540, which may also be considered a sub-element of controller 140, arbitrates between banks of the buffer 144. The DRAM arbiter 540 has a record of each open page of the DRAM 104 and uses this information to select the output from the banks of the buffer 144. In this manner, the DRAM arbiter 540 ensures that memory access commands from each of the banks of the buffer 144 is efficiently issued, reordered and/or interleaved with one another based on open/closed status of pages of the banks of the DRAM 104.

To illustrate the efficiencies presented by the second level of arbitration, consider an example in which a first memory access command output from bank 0 512 is directed to page 3, which is an unopened page of bank 0 of the DRAM 104. The DRAM arbiter 540 interleaves the first memory access command with a second memory access command from, e.g., bank 1 516, which is directed to an open page of bank 1 of the DRAM 104. Thus, at least a portion of the second memory access command may take place during a period of time that it takes for the DRAM controller 148 to close the open page of bank 0 of the DRAM 104 and open page 3.

In various embodiments, the controller 140 performs a variety of maintenance operations with respect to the data in the buffer 144. These maintenance operations include but are not limited to maintaining error correction codes, coherency of data, and relevancy (e.g., through eviction of non-relevant data).

The size of the buffer 144 may not need to be excessively large in order to provide for the system efficiencies discussed herein. In some embodiments the size of the buffer 144 is less than 100 kilobytes (kB) and in a particular embodiment is merely 20 kB. It has been shown that using of a buffer of this size, as described herein, provides an average utilization efficiency of a memory interface of between 61-71%, as opposed to an average utilization efficiency of 19-42% for memory systems not using teachings of the present disclosure.

Figure 6:
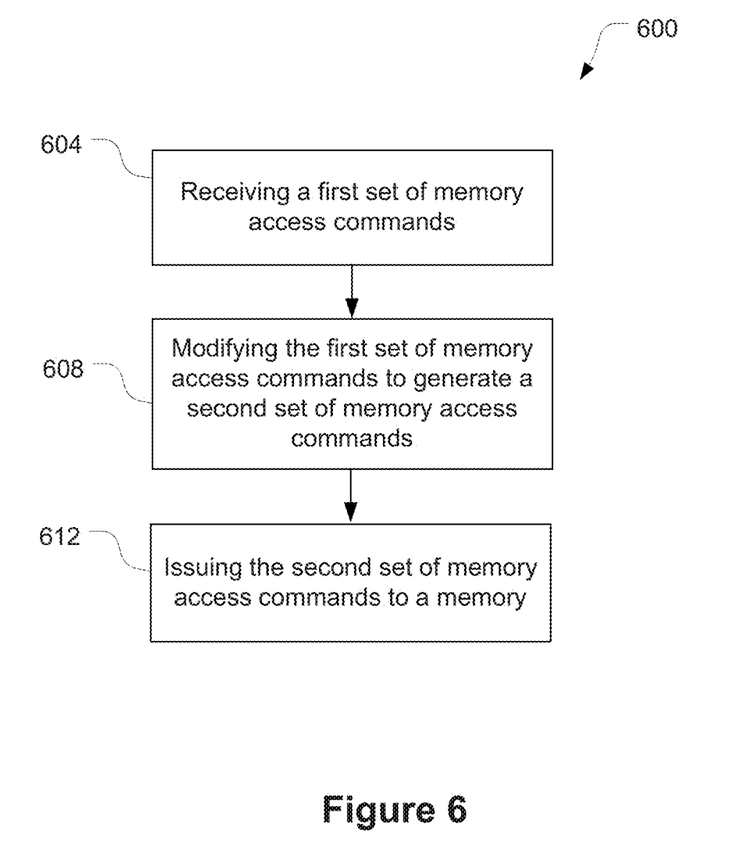
FIG. 6 is a flowchart depicting an operation of a front end of FIG. 1 in accordance with an embodiment of this disclosure.

FIG. 6 is a flowchart depicting an operation 600 of the front end 136 of FIG. 1 in accordance with an embodiment of this disclosure. The operation 600 includes, at 604, receiving (e.g., by the front end 136 from the multiplexer 128) a first set of memory access commands. At 608, the first set of memory access commands is modified (e.g., as a part of the previously discussed prefetch operation, write gathering operation and/ or the reordering operation) to generate a second set of memory access commands (e.g., by changing an order, content, etc of the first set of memory access commands). At 612, the second set of memory access commands is issued to a memory, e.g., the DRAM 104.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An apparatus for accessing a memory, the apparatus comprising:
    a buffer comprising (i) a first buffer bank configured to receive and store a first plurality of memory access commands for accessing a first memory bank of the memory and (ii) a second buffer bank configured to receive and store a second plurality of memory access commands for accessing a second memory bank of the memory;
    a first level of arbiters configured to control an order in which memory access commands are output by individual buffer banks, the first level of arbiters comprising (i) a first arbiter configured to control an order in which the first plurality of memory access commands are output by the first buffer bank and (ii) a second arbiter configured to control an order in which the second plurality of memory access commands are output by the second buffer bank, wherein the first buffer bank is configured to receive and store the first plurality of memory access commands in a first order, wherein the first buffer bank is configured to output the first plurality of memory access commands in a second order that is different from the first order, wherein the second buffer bank is configured to receive and store the second plurality of memory access commands in a third order, and wherein the second buffer bank is configured to output the second plurality of memory access commands in a fourth order that is different from the third order; and a second level of arbiter configured to control an order in which the memory access commands are output from the first and second buffer banks to the memory.

2. The apparatus of claim 1, wherein the second level of arbiter is configured to control the order in which the memory access commands are output from the first and second buffer banks to the memory by:

controlling an order of ordered memory access commands respectively output from the first and second buffer banks to the memory.

3. The apparatus of claim 1, further comprising:

a multiplexer configured to receive memory access commands output by the first and second buffer banks, wherein the second level of arbiter is configured to control the order in which the memory access commands are output from the first and second buffer banks to the memory by controlling an order in which the memory access commands are output by the multiplexer.

4. The apparatus of claim 3, wherein:

the multiplexer is configured to output the memory access commands in a fifth order that is different from ones of the second order and the fourth order.

5. The apparatus of claim 1, wherein:

the second level of arbiter is configured to, based on a record of a page of a memory bank that is currently open in the memory, control the order in which the memory access commands are output from the first and second buffer banks to the memory.

6. The apparatus of claim 1, wherein:

the first arbiter is configured to control the order in which the first plurality of memory access commands are output by the first buffer bank such that two or more memory access commands of the first plurality of memory access commands, which are directed towards a same page of the first memory bank of the memory, are output consecutively by the first buffer bank.

7. The apparatus of claim 1, wherein ones of the memory access commands are one of a read command for reading data from the memory or a write command to write data to the memory.

8. A method comprising:

receiving, (i) at a first buffer bank of a buffer and in a first order, a first plurality of memory access commands for accessing a first memory bank of a memory, and (ii) at a second buffer bank of the buffer and in a second order, a second plurality of memory access commands for accessing a second memory bank of the memory;

controlling, by a first level of arbiters, an order in which memory access commands are output respectively by individual buffer banks, the first level of arbiters comprising a first arbiter and a second arbiter, wherein controlling the order in which memory access commands are output by individual buffer banks comprises:

(i) controlling, by the first arbiter, an order in which the first plurality of memory access commands are output by the first buffer bank such that the first plurality of memory access commands are output by the first buffer bank in a third order that is different from the first order and (ii) controlling, by the second arbiter, an order in which the second plurality of memory access commands are output by the second buffer bank such that the second plurality of memory access commands are output by the second buffer bank in a fourth order that is different from the second order; and controlling, by a second level of arbiter, an order in which the memory access commands are output from the first and second buffer banks to the memory.

9. The method of claim 8, wherein controlling, by the second level of arbiter, the order in which the memory access commands are output from the first and second buffer banks to the memory comprises:

controlling an order of ordered memory access commands respectively output from the first and second buffer banks to the memory.

10. The method of claim 8, further comprising:

multiplexing, by a multiplexer, memory access commands output by the first and second buffer banks, wherein controlling, by the second level of arbiter, the order in which the memory access commands are output from the first and second buffer banks to the memory comprises controlling an order in which the memory access commands are output by the multiplexer.

11. The method of claim 10, wherein controlling, by the second level of arbiter, the order in which the memory access commands are output from the first and second buffer banks to the memory comprises:

controlling, by the second level of arbiter, the order in which the memory access commands are output from the first and second buffer banks to the memory such that the memory access commands are output from the first and second buffer banks to the memory in a fifth order that is different from ones of the third order and the fourth order.

12. The method of claim 8, wherein controlling, by the second level of arbiter, the order in which the memory access commands are output from the first and second buffer banks to the memory further comprises:

based on a record of a page of a memory bank that is currently open in the memory, controlling, by the second level of arbiter, the order in which the memory access commands are output from the first and second buffer banks to the memory.

13. The method of claim 8, wherein controlling, by the first arbiter, the order in which the first plurality of memory access commands are output by the first buffer bank further comprises:

controlling, by the first arbiter, the order in which the first plurality of memory access commands are output by the first buffer bank such that two or more memory access commands of the first plurality of memory access commands, which are directed towards a same page of the first memory bank of the memory, are output consecutively by the first buffer bank.

14. The method of claim 8, wherein ones of the memory access commands are one of a read command for reading data from the memory or a write command to write data to the memory.

* * * * *